(12) United States Patent
Sun et al.

(10) Patent No.: US 11,582,798 B2
(45) Date of Patent: Feb. 14, 2023

(54) LISTEN-BEFORE-TALK REPORTING FOR SIDELINK CHANNELS

(71) Applicant: QUALCOMM Incorporated, San Diego, CA (US)

(72) Inventors: Jing Sun, San Diego, CA (US); Ozcan Ozturk, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 17/091,369

(22) Filed: Nov. 6, 2020

(65) Prior Publication Data

US 2022/0150960 A1 May 12, 2022

(51) Int. Cl.
*H04W 4/00* (2018.01)
*H04W 74/08* (2009.01)
*H04W 72/04* (2023.01)
*H04W 72/0453* (2023.01)

(52) U.S. Cl.
CPC ..... *H04W 74/0808* (2013.01); *H04W 72/042* (2013.01); *H04W 72/0413* (2013.01); *H04W 72/0453* (2013.01)

(58) Field of Classification Search
None
See application file for complete search history.

(56) References Cited

U.S. PATENT DOCUMENTS

2020/0029318 A1\* 1/2020 Guo ..................... H04L 1/1819
2022/0061090 A1\* 2/2022 Feh .................... H04W 74/0808

FOREIGN PATENT DOCUMENTS

WO  WO-2020201490 A1  10/2020

OTHER PUBLICATIONS

International Search Report and Written Opinion—PCT/US2021/072244—ISA/EPO–dated Feb. 28, 2022.

\* cited by examiner

*Primary Examiner* — Clemence S Han
(74) *Attorney, Agent, or Firm* — Qualcomm Incorporated

(57) ABSTRACT

Various aspects of the present disclosure generally relate to wireless communication. In some aspects, a user equipment (UE) may receive, from a base station, a resource grant for at least one sidelink channel, wherein the resource grant indicates an uplink resource for transmitting sidelink transmission acknowledgement messages. The UE may transmit, to the base station and on the uplink resource, an indication of at least one status associated with a listen-before-talk procedure used on the at least one sidelink channel. Numerous other aspects are provided.

28 Claims, 11 Drawing Sheets

LISTEN-BEFORE-TALK REPORTING FOR SIDELINK CHANNELS

FIELD OF THE DISCLOSURE

Aspects of the present disclosure generally relate to wireless communication and to techniques and apparatuses for listen-before-talk reporting for sidelink channels.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving, from a base station, a resource grant for at least one sidelink channel, wherein the resource grant indicates an uplink resource for transmitting sidelink transmission acknowledgement messages; and transmitting, to the base station and on the uplink resource, an indication of at least one status associated with a listen-before-talk procedure used on the at least one sidelink channel.

In some aspects, a method of wireless communication performed by a base station includes transmitting, to a UE, a resource grant for at least one sidelink channel, wherein the resource grant indicates an uplink resource for transmitting sidelink transmission acknowledgement messages; and receiving, from the UE and on the uplink resource, an indication of at least one status associated with a listen-before-talk procedure used on the at least one sidelink channel.

In some aspects, a UE for wireless communication includes a memory and one or more processors operatively coupled to the memory, the memory and the one or more processors configured to receive, from a base station, a resource grant for at least one sidelink channel, wherein the resource grant indicates an uplink resource for transmitting sidelink transmission acknowledgement messages; and transmit, to the base station and on the uplink resource, an indication of at least one status associated with a listen-before-talk procedure used on the at least one sidelink channel.

In some aspects, a base station for wireless communication includes a memory and one or more processors operatively coupled to the memory, the memory and the one or more processors configured to transmit, to a UE, a resource grant for at least one sidelink channel, wherein the resource grant indicates an uplink resource for transmitting sidelink transmission acknowledgement messages; and receive, from the UE and on the uplink resource, an indication of at least one status associated with a listen-before-talk procedure used on the at least one sidelink channel.

In some aspects, a non-transitory computer-readable medium storing a set of instructions for wireless communication includes one or more instructions that, when executed by one or more processors of a UE, cause the UE to receive, from a base station, a resource grant for at least one sidelink channel, wherein the resource grant indicates an uplink resource for transmitting sidelink transmission acknowledgement messages; and transmit, to the base station and on the uplink resource, an indication of at least one status associated with a listen-before-talk procedure used on the at least one sidelink channel.

In some aspects, a non-transitory computer-readable medium storing a set of instructions for wireless communication includes one or more instructions that, when executed by one or more processors of a base station, cause the base station to transmit, to a UE, a resource grant for at least one sidelink channel, wherein the resource grant indicates an uplink resource for transmitting sidelink transmission acknowledgement messages; and receive, from the UE and on the uplink resource, an indication of at least one status associated with a listen-before-talk procedure used on the at least one sidelink channel.

In some aspects, an apparatus for wireless communication includes means for receiving, from a base station, a resource grant for at least one sidelink channel, wherein the resource grant indicates an uplink resource for transmitting sidelink transmission acknowledgement messages; and means for transmitting, to the base station and on the uplink resource, an indication of at least one status associated with a listen-before-talk procedure used on the at least one sidelink channel.

In some aspects, an apparatus for wireless communication includes means for transmitting, to a UE, a resource grant for at least one sidelink channel, wherein the resource grant indicates an uplink resource for transmitting sidelink transmission acknowledgement messages; and means for receiving, from the UE and on the uplink resource, an indication of at least one status associated with a listen-before-talk procedure used on the at least one sidelink channel.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
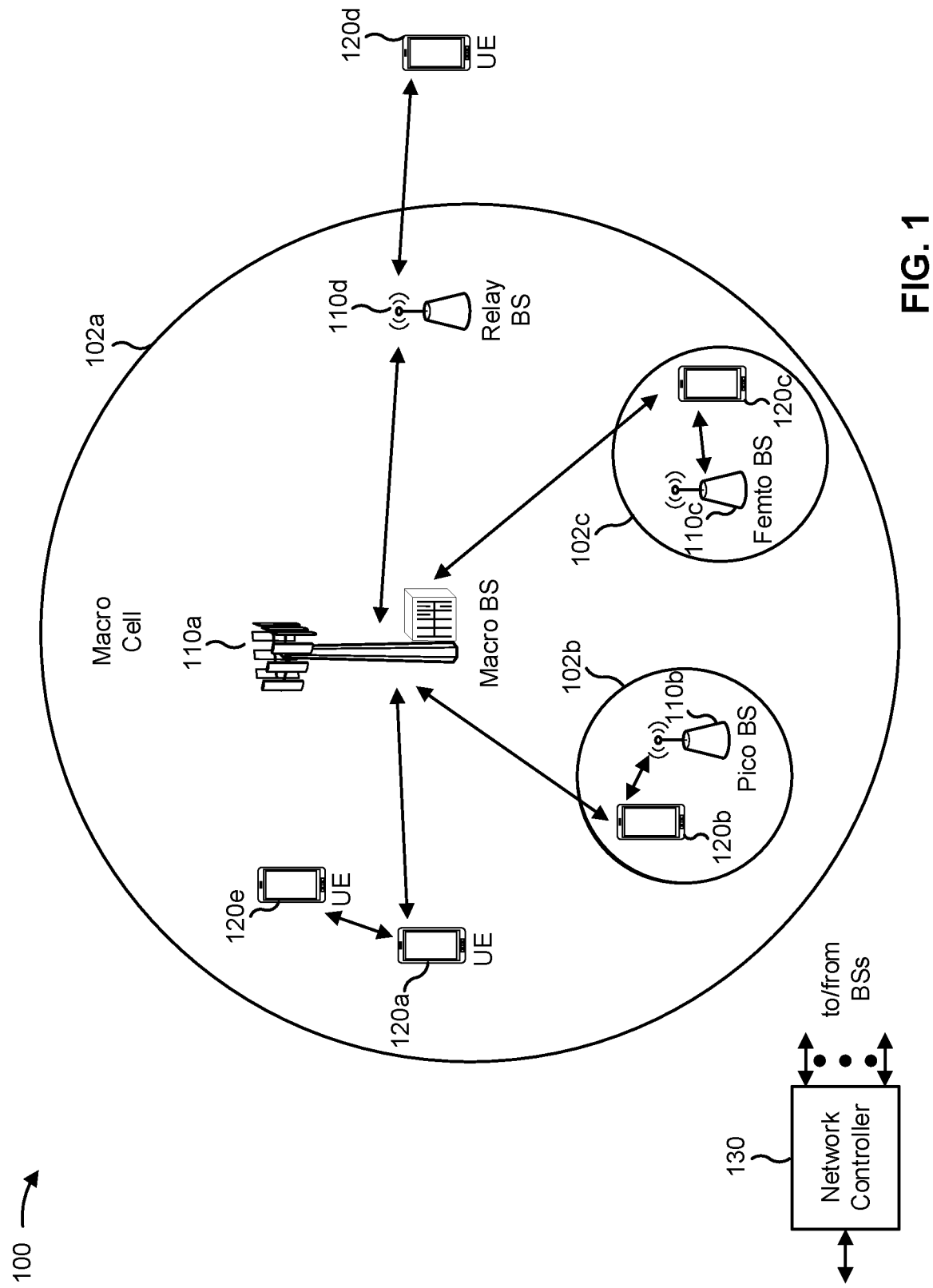
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
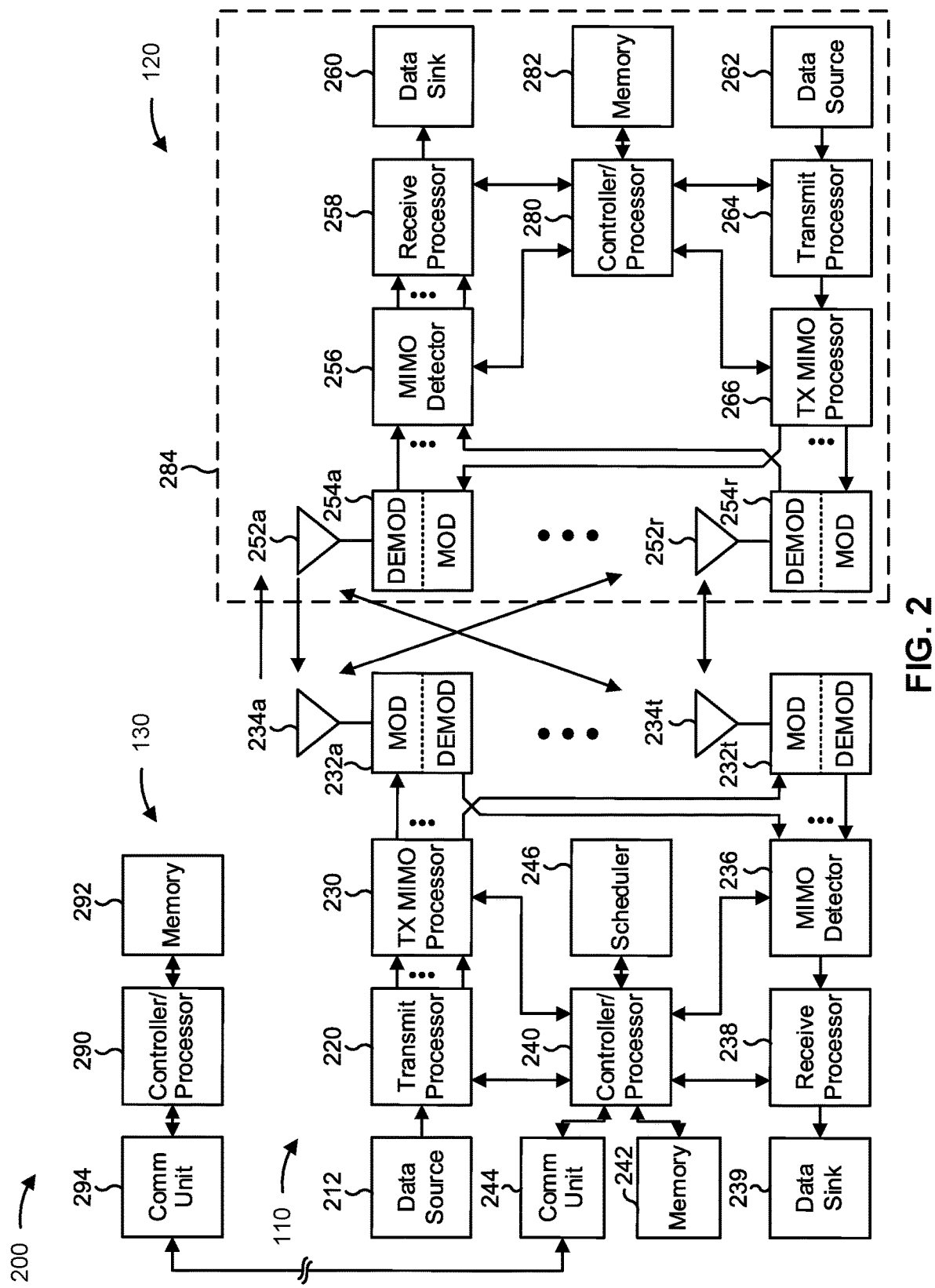
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 6-9.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 6-9.

Controller/processor 240 of base station 110, controller/processor 280 of UE 120, and/or any other component(s) of FIG. 2 may perform one or more techniques associated with LBT reporting for sidelink channels, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, interpreting the instructions, and/or the like.

In some aspects, a UE (e.g., UE 120 and/or apparatus 1000 of FIG. 10) may include means for receiving, from a base station, a resource grant for at least one sidelink channel, wherein the resource grant indicates an uplink resource for transmitting sidelink transmission acknowledgement messages; and/or means for transmitting, to the base station and on the uplink resource, an indication of at least one status associated with a listen-before-talk procedure used on the at least one sidelink channel. The means for the UE to perform operations described herein may include, for example, antenna 252, demodulator 254, MIMO detector 256, receive processor 258, transmit processor 264, TX MIMO processor 266, modulator 254, controller/processor 280, and/or memory 282. In some aspects, the UE may further include means for receiving, from the base station, an additional resource grant for at least one additional sidelink channel, wherein the resource grant indicates the uplink resource for transmitting sidelink transmission acknowledgement messages; and/or means for determining at least one additional status associated with a listen-before-talk procedure used on the at least one additional sidelink channel.

In some aspects, a base station (e.g., base station 110 and/or apparatus 1100 of FIG. 11) may include means for transmitting, to a UE, a resource grant for at least one sidelink channel, wherein the resource grant indicates an uplink resource for transmitting sidelink transmission acknowledgement messages; and/or means for receiving, from the UE and on the uplink resource, an indication of at least one status associated with a listen-before-talk procedure used on the at least one sidelink channel. The means for the base station to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246. In some aspects, the base station may further include means for transmitting, to the UE, an additional resource grant for at least one additional sidelink channel, wherein the resource grant indicates the uplink resource for transmitting sidelink transmission acknowledgement messages.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
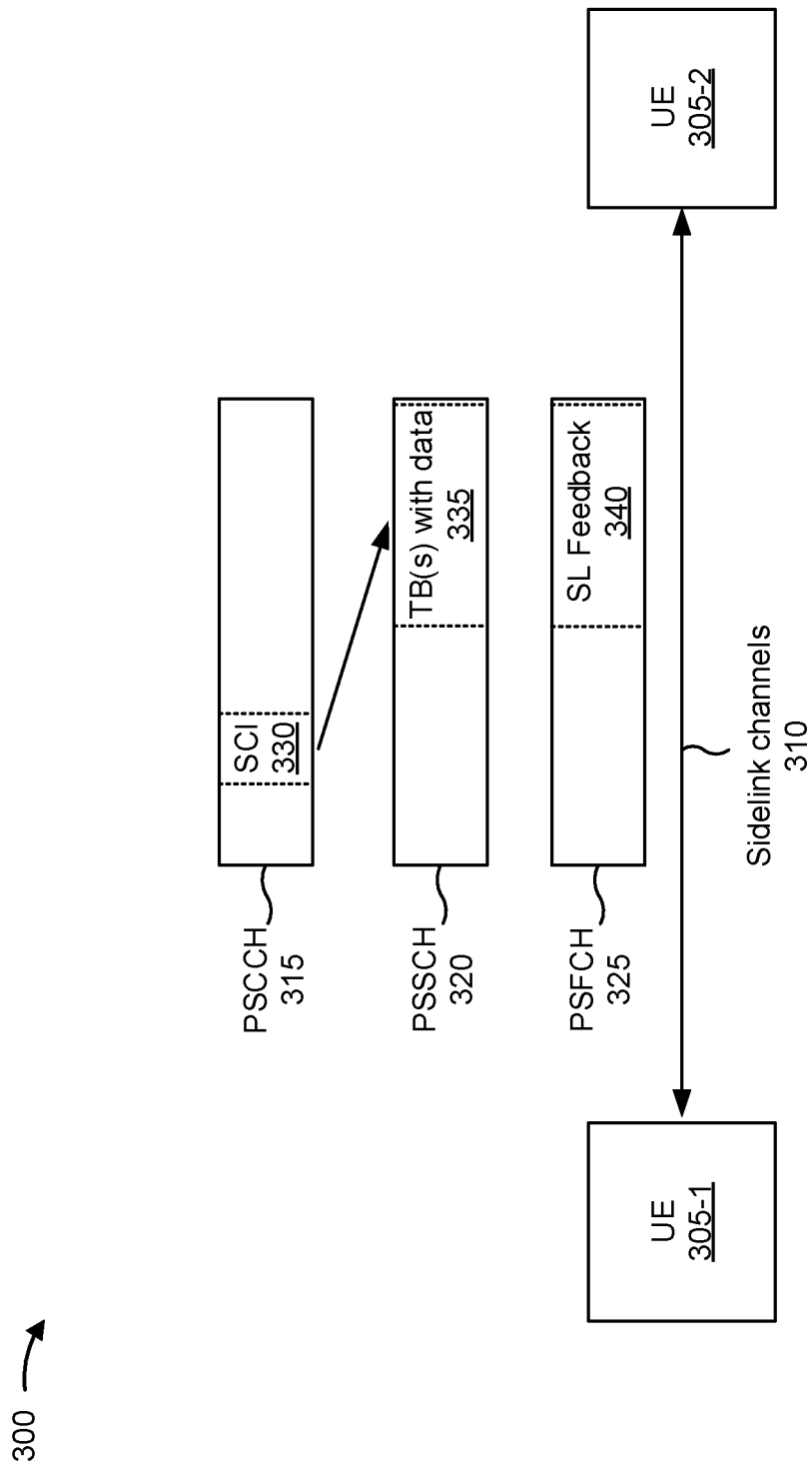
FIG. 3 is a diagram illustrating an example of sidelink communications, in accordance with various aspects of the present disclosure.

FIG. 3 is a diagram illustrating an example 300 of sidelink communications, in accordance with various aspects of the present disclosure. As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, V2P communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
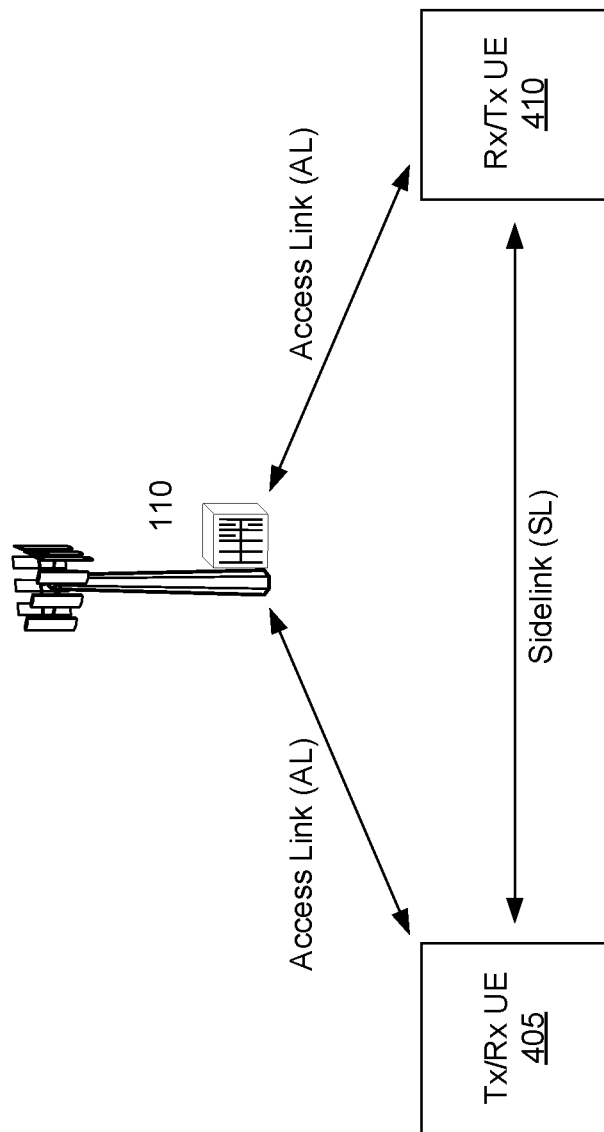
FIG. 4 is a diagram illustrating an example of sidelink communications and access link communications, in accordance with various aspects of the present disclosure.

FIG. 4 is a diagram illustrating an example 400 of sidelink communications and access link communications, in accordance with various aspects of the present disclosure. As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
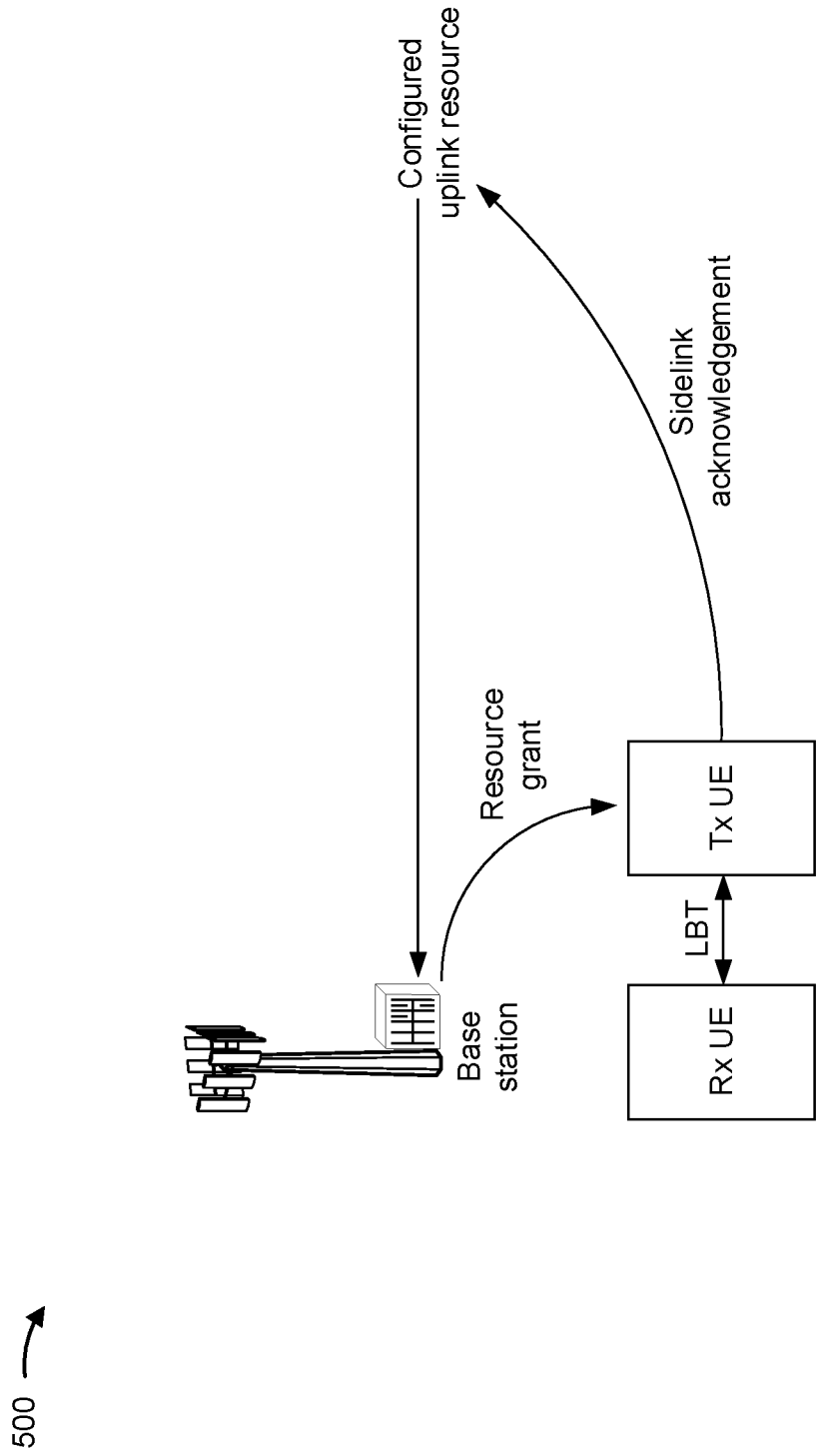
FIG. 5 is a diagram illustrating an example of acknowledgement messages for sidelink channels, in accordance with various aspects of the present disclosure.

FIG. 5 is a diagram illustrating an example 500 of acknowledgement messages for sidelink channels, in accordance with various aspects of the present disclosure. As shown in FIG. 5, example 500 includes one UE (e.g., Tx UE) transmitting data to another UE (e.g., Rx UE) on at least one sidelink channel (e.g., as described above in connection with FIGS. 3 and 4).

In some aspects, a base station may transmit, and the Tx UE may receive, a resource grant for the at least one sidelink channel. For example, as shown in FIG. 5, the resource grant may include downlink control information (DCI), such as a format 3_0 DCI (e.g., as defined in 3GPP specifications and/or other standards). The resource grant may indicate one or more time resources (e.g., one or more symbols across one or more slots within one or more frames) for the Tx UE to use on the at least one sidelink channel. Additionally, or alternatively, the resource grant may indicate one or more frequency resources (e.g., one or more component carriers (CCs) to use on one or more subbands within one or more bandwidth parts (BWPs)) for the Tx UE to use on the at least one sidelink channel.

As further shown in FIG. 5, the resource grant may indicate an uplink resource (e.g., a resource on a PUCCH) such that the Tx UE can report acknowledgement messages (e.g., ACK/NACK feedback and/or other HARQ feedback) received from the Rx UE (e.g., on a PSFCH as shown in example 500). In some aspects, the Tx UE may copy the acknowledgement message received on the PSFCH to the PUCCH indicated by the resource grant. In one example, when the Tx UE unicasts data (e.g., to the Rx UE only), the Tx UE may copy an acknowledgement message received on the PSFCH to the PUCCH and transmit a NACK feedback on the PUCCH when nothing is received on the PSFCH. In another example, when the Tx UE groupcasts data (e.g., to a group of UEs including the Rx UE), the Tx UE may transmit an ACK feedback on the PUCCH when an ACK message is received on all PSFCHs from the group of UEs and transmit a NACK feedback otherwise. In yet another example, when the Tx UE performs zone-based transmission (e.g., to a geographical zone in which the Rx UE is located), the Tx UE may transmit a NACK feedback on the PUCCH when a NACK message is received on any PSFCH and transmit an ACK feedback otherwise.

In some aspects, the Tx UE may use an LBT procedure on the at least one sidelink channel. For example, the Tx UE may wait for one or more symbols of a slot, and transmit (e.g., to the Rx UE) within that slot only when the Tx UE did not decode a transmission in those one or more symbols. In some aspects, the Tx UE may use the LBT procedure at least in part because the at least one sidelink channel is over an unlicensed band channel. For example, the at least one sidelink channel may use NR unlicensed (NR-U) spectrum.

Generally, the physical layer of the Tx UE may report LBT statuses (e.g., passes or fails) to an upper layer of the Tx UE (e.g., a medium access control (MAC) layer). The upper layer will filter and average the LBT statuses and report them to the base station (e.g., using a MAC control element (MAC-CE)). However, this results in a delay between the Tx UE detecting LBT statuses and reporting them to the base station. Moreover, the Tx UE consumes additional processing resources by filtering and averaging the LBT statuses even though this results in the base station receiving less accurate information about which subbands on the at least one sidelink channel should be reallocated.

Some techniques and apparatuses described herein allow a UE (e.g., UE 120 and/or UE 405) to report at least one status, associated with an LBT procedure, using an uplink channel (e.g., a PUCCH) configured by a base station (e.g., base station 110). Accordingly, the UE 405 may report LBT statuses to the base station 110 with reduced latency and while conserving processing resources. In addition, the base station 110 may receive more accurate LBT statuses from the UE 405. Accordingly, the base station 110 may more effectively reallocate subbands on one or more sidelink channels and thus improve quality and reliability of communications on those sidelink channels.

As indicated above, FIG. 5 is provided as an example. Other examples may differ from what is described with respect to FIG. 5.

Figure 6:
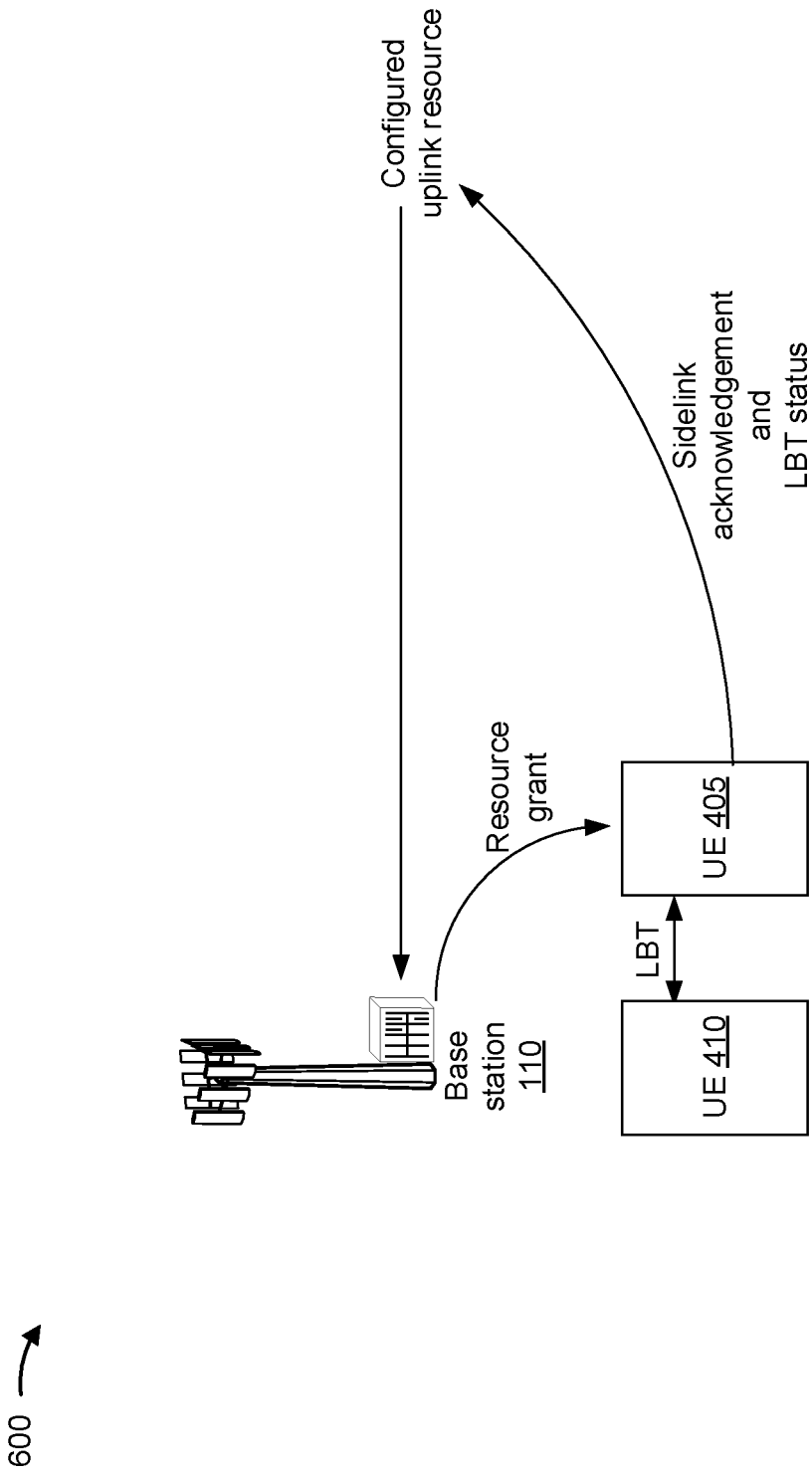
FIGS. 6 and 7 are diagrams illustrating examples associated with listen-before-talk (LBT) reporting for sidelink channels, in accordance with various aspects of the present disclosure.

FIG. 6 is a diagram illustrating an example 600 associated with LBT reporting for sidelink channels, in accordance with various aspects of the present disclosure. In some aspects, a base station (e.g., base station 110) may transmit, and a UE (e.g., UE 405) may receive, a resource grant for at least one sidelink channel (e.g., as described above in connection with FIGS. 3 and 4). Accordingly, the UE 405 may communicate with one or more additional UEs (e.g., UE 410) on the at least one sidelink channel. In some aspects, the resource grant may include DCI, such as a format 3_0 DCI (e.g., as defined in 3GPP specifications and/or other standards).

As shown in FIG. 6, the resource grant may indicate an uplink resource for transmitting sidelink transmission acknowledgement messages. For example, the resource grant may indicate the uplink resource (e.g., a resource on a PUCCH) such that the UE 405 can report acknowledgement messages (e.g., ACK/NACK feedback and/or other HARQ feedback) received from the UE 410 (e.g., on a PSFCH as shown in example 600).

In some aspects, the UE 405 may use an LBT procedure on the at least one sidelink channel. For example, the UE 405 may use the LBT procedure at least in part because the at least one sidelink channel is over an unlicensed band channel.

As further shown in FIG. 6, the UE 405 may transmit, and the base station 110 may receive, on the uplink resource (e.g., on the PUCCH resource), an indication of at least one status associated with the LBT procedure used on the at least one sidelink channel. In some aspects, as described below in connection with FIG. 7, the indication may further be based at least in part on one or more sidelink transmission acknowledgement messages (e.g., received on the PSFCH). Accordingly, as described below in connection with FIG. 7, the indication of the at least one status may include two or more bits.

In some aspects, the UE 405 may receive an additional resource grant for at least one additional sidelink channel. Additionally, the resource grant may indicate the uplink resource for transmitting sidelink transmission acknowledgement messages. Accordingly, multiple resource grants (e.g., format 3_0 DCI as defined in 3GPP specifications and/or other resource grants) may indicate the same uplink resource (e.g., the same PUCCH resource) for reporting acknowledgement messages (e.g., ACK/NACK feedback and/or other HARQ feedback) received from the UE 410 (e.g., on a PSFCH as shown in example 600).

In some aspects, the UE 405 may use an LBT procedure on the at least one additional sidelink channel. For example, the UE 405 may use the LBT procedure at least in part because the at least one additional sidelink channel is over an unlicensed band channel.

Accordingly, the UE 405 may determine at least one additional status associated with the LBT procedure used on the at least one additional sidelink channel. Additionally, the UE 405 may combine the at least one additional status with the at least one status (e.g., as described below in connection with FIG. 7) before transmitting on the uplink resource.

By using the technique described in connection with FIG. 6, the UE 405 may report at least one status, associated with an LBT procedure, using an uplink channel (e.g., a PUCCH) configured by the base station 110. Accordingly, the UE 405 may report LBT statuses to the base station 110 with reduced latency and while conserving processing resources. In addition, the base station 110 may receive more accurate LBT statuses from the UE 405. Accordingly, the base station 110 may more effectively reallocate subbands on the at least one sidelink channel and thus improve quality and reliability of communications on the at least one sidelink channel.

As indicated above, FIG. 6 is provided as an example. Other examples may differ from what is described with respect to FIG. 6.

Figure 7:
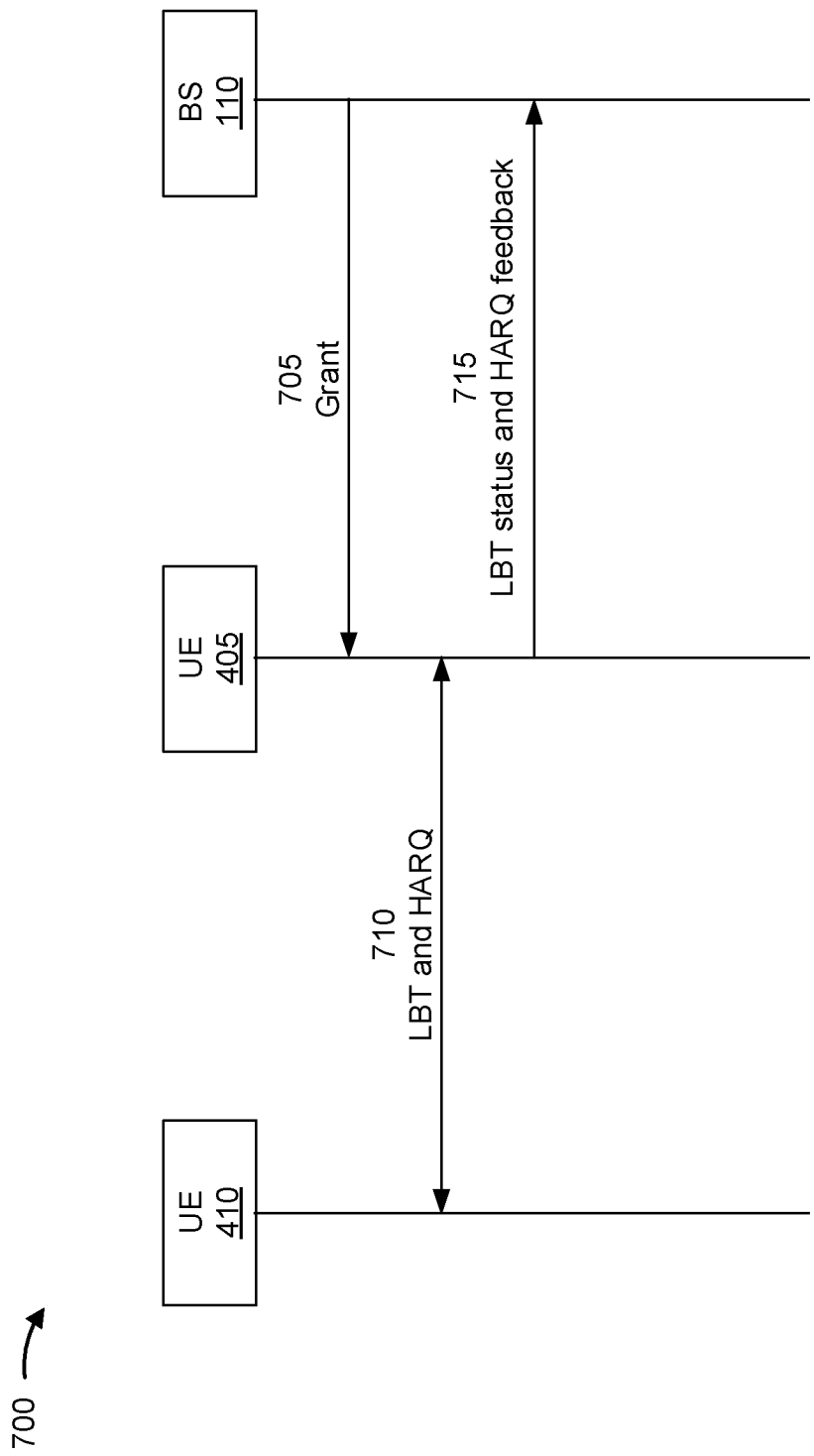

FIG. 7 is a diagram illustrating an example 700 associated with LBT reporting for sidelink channels, in accordance with various aspects of the present disclosure. As shown in FIG. 7, example 700 includes communication between a base station 110 and a UE 405. In some aspects, the base station 110 and the UE 405 may be included in a wireless network, such as wireless network 100. The base station 110 and the UE 405 may communicate on a wireless access link, which may include an uplink and a downlink.

As further shown in FIG. 7, example 700 includes communication between a UE 410 and the UE 405. In some aspects, the UE 410 and the UE 405 may communicate on at least one sidelink channel (e.g., as described above in connection with FIGS. 3 and 4). For example, the at least one sidelink channel may include a PSSCH.

As shown in connection with reference number 705, the base station 110 may transmit, and the UE 405 may receive, a resource grant for at least one sidelink channel (e.g., as described above in connection with FIGS. 3 and 4). The resource grant may indicate one or more time resources (e.g., one or more symbols across one or more slots within one or more frames) for the UE 405 to use on the at least one sidelink channel. Additionally, or alternatively, the resource grant may indicate one or more frequency resources (e.g., one or more CCs to use on one or more subbands within one or more BWPs) for the UE 405 to use on the at least one sidelink channel. In some aspects, the resource grant may include DCI, such as a format 3_0 DCI (e.g., as defined in 3GPP specifications and/or other standards).

In some aspects, the resource grant may indicate an uplink resource for transmitting sidelink transmission acknowledgement messages. For example, the resource grant may indicate the uplink resource (e.g., a PUCCH resource) such that the UE 405 can report acknowledgement messages (e.g., ACK/NACK feedback and/or other HARQ feedback) received from the UE 410 (e.g., on a PSFCH).

In some aspects, the UE 405 may use an LBT procedure on the at least one sidelink channel. For example, the UE 405 may wait for one or more symbols of a slot and transmit (e.g., to the UE 410) within that slot only when the UE 405 did not decode a transmission in those one or more symbols. In some aspects, the UE 405 may use the LBT procedure at least in part because the at least one sidelink channel is over an unlicensed band channel. For example, the at least one sidelink channel may use NR-U spectrum.

As shown in connection with reference number 710, the UE 405 may determine at least one status associated with the LBT procedure used on the at least one sidelink channel. For example, the at least one status associated with the LBT procedure may include at least one of an LBT pass status or an LBT fail status.

In some aspects, the at least one sidelink channel includes a plurality of LBT subbands. For example, the at least one sidelink channel may include a plurality of 20 MHz (and/or another size) subbands such that the UE 405 may perform wideband transmission across the plurality of LBT subbands. Accordingly, in some aspects, the at least one status may include a plurality of statuses corresponding to the plurality of LBT subbands. For example, the UE 405 may determine a corresponding LBT pass status or LBT fail status for each subband of the plurality of subbands.

In some aspects, as further shown in connection with reference number 710, the UE 405 may determine an acknowledgement message (e.g., HARQ feedback) associated with the at least one sidelink channel. For example, when the UE 405 unicasts data (e.g., to the UE 410 only), the UE 405 may determine the acknowledgement message as an ACK feedback or a NACK feedback received on the PSFCH or as a NACK feedback when nothing is received on the PSFCH. In another example, when the UE 405 groupcasts data (e.g., to a group of UEs including the UE 410), the UE 405 may determine the acknowledgement message as an ACK feedback when an ACK message is received on all PSFCHs from the group of UEs or as a NACK feedback otherwise. In yet another example, when the UE 405 performs zone-based transmission (e.g., to a geographical zone in which the UE 410 is located), the UE 405 may determine the acknowledgement message as a NACK feedback when a NACK message is received on any PSFCH, and as an ACK feedback otherwise.

In some aspects, the UE 405 may combine the at least one status associated with the LBT procedure with the acknowledgement message (e.g., HARQ feedback) associated with the at least one sidelink channel. For example, the LBT pass status may be a sidelink transmission acknowledgement with LBT pass status or a sidelink transmission non-acknowledgement with LBT pass status. In another example, the LBT pass status may be a sidelink transmission acknowledgement with LBT pass status, a sidelink transmission non-acknowledgement with LBT pass status, or a sidelink acknowledgement undetected with LBT pass status.

As shown in connection with reference number 715, the UE 405 may transmit, and the base station 110 may receive, on the uplink resource, an indication of the at least one status associated with the LBT procedure used on the at least one sidelink channel. In some aspects, the indication of the at least one status associated with the LBT procedure may include at least two bits. For example, the indication may indicate an LBT fail status using a codepoint of '00', a sidelink transmission acknowledgement with LBT pass status using a codepoint of '10', or a sidelink transmission non-acknowledgement with LBT pass status using a codepoint of '01'. In another example, the indication may indicate an LBT fail status using a codepoint of '00', a sidelink transmission acknowledgement with LBT pass status using a codepoint of '10', a sidelink transmission non-acknowledgement with LBT pass status using a codepoint of '01', or a sidelink acknowledgement undetected with LBT pass status using a codepoint of '11'.

In some aspects, the indication of the at least one status associated with the LBT procedure may include at least a quantity of bits corresponding to a quantity of the plurality of LBT subbands. For example, when the at least one sidelink channel includes four LBT subbands, the indication may include at least four bits, with one bit corresponding to each subband of the plurality of subbands. In another example, when the at least one sidelink channel includes seven LBT subbands, the indication may include at least seven bits, with one bit corresponding to each subband of the plurality of subbands. In some aspects, the indication may include one additional bit for the acknowledgement message (e.g., HARQ feedback) associated with the at least one sidelink channel.

As an alternative, the indication of the at least one status associated with the LBT procedure may include at least a quantity of bits greater than a quantity of the plurality of LBT subbands. For example, the base station 110 may transmit (e.g., using a radio resource control (RRC) message) a configuration for the uplink resource including more bits than a quantity of the plurality of LBT subbands. Accordingly, the indication of the at least one status may include one or more padding bits. For example, the UE 405 may insert one or more zeroes and/or other padding bits.

As an alternative, the indication of the at least one status associated with the LBT procedure may include at least a quantity of bits less than a quantity of the plurality of LBT subbands. Accordingly, in some aspects, the indication of the at least one status may include at least one bit that combines two or more statuses associated with two or more of the plurality of LBT subbands. For example, the UE 405 may group subbands uniformly. In one example, when the at least one sidelink channel includes four LBT subbands, and the indication of the at least one status includes two bits, the UE 405 may combine statuses (e.g., using an OR operation and/or another logic operation) associated with the first and second subbands into the first bit, and statuses associated with the third and fourth subbands into the second bit. In another example, when the at least one sidelink channel includes six LBT subbands, and the indication of the at least one status includes four bits, the UE 405 may combine statuses (e.g., using an OR operation and/or another logic operation) associated with the first and second subbands into the first bit, and statuses associated with the fifth and sixth subbands into the fourth bit. As an alternative, the UE 405 may group subbands non-uniformly. In one example, when the at least one sidelink channel includes six LBT subbands, and the indication of the at least one status includes three bits, the UE 405 may combine statuses (e.g., using an OR operation and/or another logic operation) associated with the third, fourth, fifth, and sixth subbands into the third bit. In another example, when the at least one sidelink channel includes seven LBT subbands, and the indication of the at least one status includes four bits, the UE 405 may combine statuses (e.g., using an OR operation and/or another logic operation) associated with the first, second, third, and fourth subbands into the first bit. Additionally, or alternatively, the indication of the at least one status may omit one or more statuses associated with one or more of the plurality of LBT subbands. Accordingly, the UE 405 may omit statuses based at least in part on an order of the plurality of LBT subbands. For example, when the at least one sidelink channel includes six LBT subbands, and the indication of the at least one status includes four bits, the UE 405 may omit statuses associated with the fifth and sixth subbands. In another example, when the at least one sidelink channel includes five LBT subbands, and the indication of the at least one status includes three bits, the UE 405 may omit statuses associated with the first and second subbands.

In some aspects, the base station 110 may schedule a plurality of transmissions on the at least one sidelink channel. For example, the DCI and/or other resource grant may schedule multiple transmissions on the PSSCH with a same transport block (TB) size. In some aspects, each transmission of the plurality of transmissions may be associated with one or more corresponding LBT results (e.g., one LBT result for each of a plurality of subbands used for that transmission). Accordingly, in any of the aspects described above, the at least one status may be based at least in part on a logic OR operation of LBT results of a plurality of transmissions. For example, if the UE 405 determines an LBT pass status for at least one of the plurality of transmissions, the at least one status will be set to the LBT pass status.

Additionally, as described above, the at least one status may include a plurality of statuses corresponding to a plurality of LBT subbands on the at least one sidelink channel. Accordingly, each status of the plurality of statuses may be based at least in part on a logic OR operation of LBT results of a plurality of transmissions on a corresponding one of the plurality of LBT subbands. For example, if the UE 405 determines an LBT pass status, on a subband, for at least one of a plurality of transmissions on that subband, the corresponding status, of the plurality of statuses, for that subband, will be set to the LBT pass status.

In some aspects, the base station 110 may transmit, and the UE 405 may receive, an additional resource grant for at least one additional sidelink channel. Additionally, the resource grant may indicate the uplink resource for transmitting sidelink transmission acknowledgement messages. Accordingly, multiple resource grants (e.g., format 3_0 DCI as defined in 3GPP specifications, and/or other resource grants) may indicate the same uplink resource (e.g., the same PUCCH resource) for reporting acknowledgement messages (e.g., ACK/NACK feedback and/or other HARQ feedback) received from the UE 410 and/or another UE on the at least one additional sidelink channel.

In some aspects, the UE 405 may use an LBT procedure on the at least one additional sidelink channel. For example, the UE 405 may use the LBT procedure at least in part because the at least one additional sidelink channel is over an unlicensed band channel.

Accordingly, the UE 405 may determine at least one additional status associated with the LBT procedure used on the at least one additional sidelink channel. In some aspects, the UE 405 may transmit, and the base station may receive, the indication of the at least one additional status, associated with the LBT procedure used on the at least one additional sidelink channel, combined with the indication of the at least one status, associated with the LBT procedure used on the at least one sidelink channel. In some aspects, the UE 405 may combine the at least one status with the at least one additional status based at least in part on a logic OR operation. For example, if the UE 405 determines an LBT pass status for at least one of a plurality of transmissions scheduled by the resource grant and the additional resource grant, the UE 405 will transmit an LBT pass status.

In some aspects, as described above, the at least one sidelink channel may include a plurality of LBT subbands. Similarly, the at least one additional sidelink channel may include an additional plurality of LBT subbands. Accordingly, in some aspects, the at least one status may include a plurality of statuses corresponding to the plurality of LBT subbands, and the at least one additional status may include a plurality of additional statuses corresponding to the plurality of additional LBT subbands. Additionally, the UE 405 may transmit the indication of the plurality of additional statuses combined with the indication of the plurality of statuses. In some aspects, the UE 405 may combine the plurality of additional statuses with the plurality of statuses based at least in part on a logic OR operation. For example, if the UE 405 determines an LBT pass status, on a subband, for at least one of a plurality of transmissions scheduled by the resource grant and the additional resource grant on that subband, the UE 405, for that subband, will transmit an LBT pass status. Additionally, or alternatively, and as described above, the UE 405 may pad and/or compress (e.g., uniformly or non-uniformly) the plurality of additional statuses, the plurality of statuses, or a combination thereof (e.g., when the indication includes a quantity of bits larger or smaller than a quantity of the plurality of LBT subbands and/or of the additional plurality of LBT subbands).

By using the technique described in connection with FIG. 7, the UE 405 may report at least one status, associated with an LBT procedure, using an uplink channel (e.g., a PUCCH) configured by the base station 110. Accordingly, the UE 405 may report LBT statuses to the base station 110 with reduced latency and while conserving processing resources. In addition, the base station 110 may receive more accurate LBT statuses from the UE 405. Accordingly, the base station 110 may more effectively reallocate subbands on the at least one sidelink channel and thus improve quality and reliability of communications on the at least one sidelink channel.

As indicated above, FIG. 7 is provided as an example. Other examples may differ from what is described with respect to FIG. 7.

Figure 8:
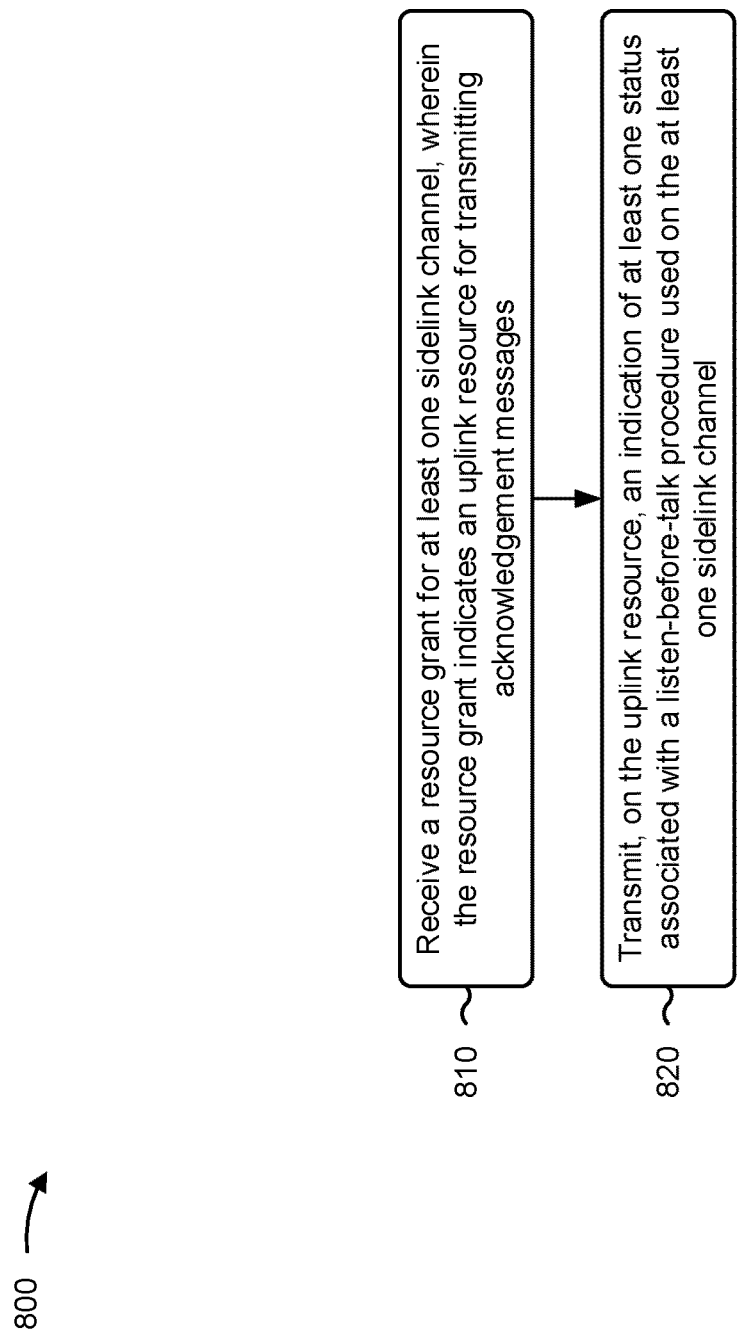
FIGS. 8 and 9 are diagrams illustrating example processes associated with LBT reporting for sidelink channels, in accordance with various aspects of the present disclosure.

FIG. 8 is a diagram illustrating an example process 800 performed, for example, by a UE, in accordance with various aspects of the present disclosure. Example process 800 is an example where the UE (e.g., UE 120, UE 405, and/or apparatus 1000 of FIG. 10) performs operations associated with LBT reporting for sidelink channels.

As shown in FIG. 8, in some aspects, process 800 may include receiving, from a base station (e.g., base station 110 and/or apparatus 1100 of FIG. 11), a resource grant for at least one sidelink channel (block 810). For example, the UE (e.g., using reception component 1002, depicted in FIG. 10) may receive, from the base station, the resource grant for the at least one sidelink channel, as described above. In some aspects, the resource grant indicates an uplink resource for transmitting sidelink transmission acknowledgement messages.

As further shown in FIG. 8, in some aspects, process 800 may include transmitting, to the base station and on the uplink resource, an indication of at least one status associated with an LBT procedure used on the at least one sidelink channel (block 820). For example, the UE (e.g., using transmission component 1004, depicted in FIG. 10) may transmit, to the base station and on the uplink resource, the indication of the at least one status associated with the LBT procedure used on the at least one sidelink channel, as described above.

Process 800 may include additional aspects, such as any single aspect or any combination of aspects described below and/or in connection with one or more other processes described elsewhere herein.

In a first aspect, the resource grant includes DCI.

In a second aspect, alone or in combination with the first aspect, the at least one sidelink channel is over an unlicensed band channel.

In a third aspect, alone or in combination with one or more of the first and second aspects, the uplink resource includes a PUCCH resource.

In a fourth aspect, alone or in combination with one or more of the first through third aspects, the indication of the at least one status associated with the LBT procedure includes at least two bits.

In a fifth aspect, alone or in combination with one or more of the first through fourth aspects, the at least one status associated with the LBT procedure includes at least one of an LBT pass status or an LBT fail status.

In a sixth aspect, alone or in combination with one or more of the first through fifth aspects, the LBT pass status is a sidelink transmission acknowledgement with LBT pass status or a sidelink transmission non-acknowledgement with LBT pass status.

In a seventh aspect, alone or in combination with one or more of the first through sixth aspects, the LBT pass status is a sidelink transmission acknowledgement with LBT pass status, a sidelink transmission non-acknowledgement with LBT pass status, or a sidelink acknowledgement undetected with LBT pass status.

In an eighth aspect, alone or in combination with one or more of the first through seventh aspects, the at least one sidelink channel includes a plurality of LBT subbands.

In a ninth aspect, alone or in combination with one or more of the first through eighth aspects, the at least one status includes a plurality of statuses corresponding to the plurality of LBT subbands.

In a tenth aspect, alone or in combination with one or more of the first through ninth aspects, the indication of the at least one status associated with the LBT procedure includes at least a quantity of bits corresponding to a quantity of the plurality of LBT subbands.

In an eleventh aspect, alone or in combination with one or more of the first through tenth aspects, the indication of the at least one status associated with the LBT procedure includes at least a quantity of bits that is greater than a quantity of the plurality of LBT subbands.

In a twelfth aspect, alone or in combination with one or more of the first through eleventh aspects, the indication of the at least one status includes one or more padding bits.

In a thirteenth aspect, alone or in combination with one or more of the first through twelfth aspects, the indication of the at least one status associated with the LBT procedure includes at least a quantity of bits that is less than a quantity of the plurality of LBT subbands.

In a fourteenth aspect, alone or in combination with one or more of the first through thirteenth aspects, the indication of the at least one status includes at least one bit that combines two or more statuses associated with two or more of the plurality of LBT subbands.

In a fifteenth aspect, alone or in combination with one or more of the first through fourteenth aspects, the indication of the at least one status omits one or more statuses associated with one or more of the plurality of LBT subbands.

In a sixteenth aspect, alone or in combination with one or more of the first through fifteenth aspects, the at least one status includes a plurality of statuses corresponding to a plurality of transmissions on the at least one sidelink channel.

In a seventeenth aspect, alone or in combination with one or more of the first through sixteenth aspects, the at least one status is based at least in part on a logic OR operation of LBT results of a plurality of transmissions.

In an eighteenth aspect, alone or in combination with one or more of the first through seventeenth aspects, the at least one status includes a plurality of statuses corresponding to a plurality of LBT subbands on the at least one sidelink channel, and each status of the plurality of statuses is based at least in part on a logic OR operation of LBT results of a plurality of transmissions on a corresponding one of the plurality of LBT subbands.

In a nineteenth aspect, alone or in combination with one or more of the first through eighteenth aspects, process 800 further includes receiving (e.g., using reception component 1002), from the base station, an additional resource grant for at least one additional sidelink channel, the resource grant indicating the uplink resource for transmitting sidelink transmission acknowledgement messages; and determining (e.g., using determination component 1008, depicted in FIG. 10) at least one additional status associated with an LBT procedure used on the at least one additional sidelink channel.

In a twentieth aspect, alone or in combination with one or more of the first through nineteenth aspects, transmitting the indication of the at least one status comprises transmitting the indication of the at least one additional status combined with the indication of the at least one status.

In a twenty-first aspect, alone or in combination with one or more of the first through twentieth aspects, the at least one sidelink channel includes a plurality of LBT subbands, and the at least one additional sidelink channel includes an additional plurality of LBT subbands.

In a twenty-second aspect, alone or in combination with one or more of the first through twenty-first aspects, the at least one status includes a plurality of statuses corresponding to the plurality of LBT subbands, the at least one additional status includes a plurality of additional statuses corresponding to the plurality of additional LBT subbands, and transmitting the indication of the at least one status comprises transmitting the indication of the plurality of additional statuses combined with the indication of the plurality of statuses.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
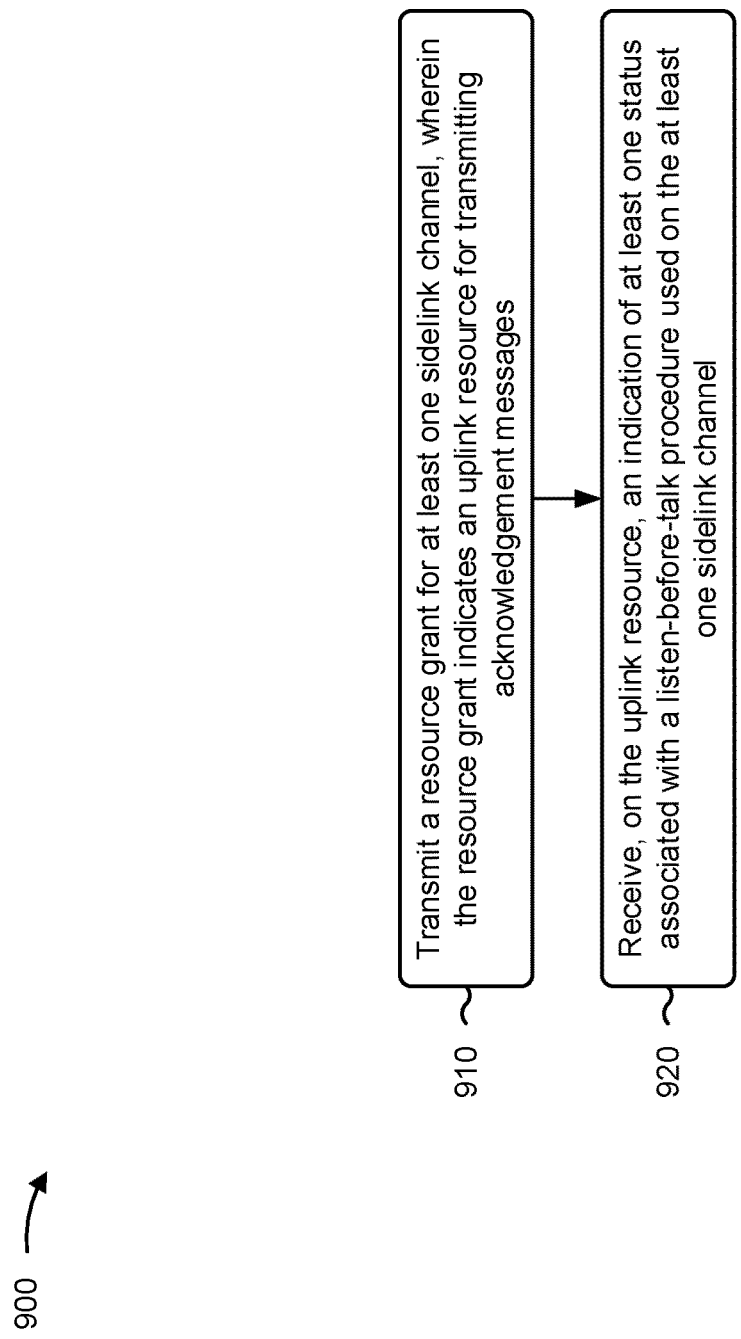

FIG. 9 is a diagram illustrating an example process 900 performed, for example, by a base station, in accordance with various aspects of the present disclosure. Example process 900 is an example where the base station (e.g., base station 110 and/or apparatus 1100 of FIG. 11) performs operations associated with LBT reporting for sidelink channels.

As shown in FIG. 9, in some aspects, process 900 may include transmitting, to a UE (e.g., UE 120, UE 405, and/or apparatus 1000 of FIG. 10), a resource grant for at least one sidelink channel (block 910). For example, the base station (e.g., using transmission component 1104, depicted in FIG. 11) may transmit, to the UE, the resource grant for the at least one sidelink channel, as described above. In some aspects, the resource grant indicates an uplink resource for transmitting sidelink transmission acknowledgement messages.

As further shown in FIG. 9, in some aspects, process 900 may include receiving, from the UE and on the uplink resource, an indication of at least one status associated with an LBT procedure used on the at least one sidelink channel (block 920). For example, the base station (e.g., using reception component 1102, depicted in FIG. 11) may receive, from the UE and on the uplink resource, the indication of the at least one status associated with the LBT procedure used on the at least one sidelink channel, as described above.

Process 900 may include additional aspects, such as any single aspect or any combination of aspects described below and/or in connection with one or more other processes described elsewhere herein.

In a first aspect, the resource grant includes DCI.

In a second aspect, alone or in combination with the first aspect, the at least one sidelink channel is over an unlicensed band channel.

In a third aspect, alone or in combination with one or more of the first and second aspects, the uplink resource includes a PUCCH resource.

In a fourth aspect, alone or in combination with one or more of the first through third aspects, the indication of the at least one status associated with the listen-before-talk procedure includes at least two bits.

In a fifth aspect, alone or in combination with one or more of the first through fourth aspects, the at least one status associated with the LBT procedure includes at least one of an LBT pass status or an LBT fail status.

In a sixth aspect, alone or in combination with one or more of the first through fifth aspects, the LBT pass status is a sidelink transmission acknowledgement with LBT pass status or a sidelink transmission non-acknowledgement with LBT pass status.

In a seventh aspect, alone or in combination with one or more of the first through sixth aspects, the LBT pass status is a sidelink transmission acknowledgement with LBT pass status, a sidelink transmission non-acknowledgement with LBT pass status, or a sidelink acknowledgement undetected with LBT pass status.

In an eighth aspect, alone or in combination with one or more of the first through seventh aspects, the at least one sidelink channel includes a plurality of LBT subbands.

In a ninth aspect, alone or in combination with one or more of the first through eighth aspects, the at least one status includes a plurality of statuses corresponding to the plurality of LBT subbands.

In a tenth aspect, alone or in combination with one or more of the first through ninth aspects, the indication of the at least one status associated with the LBT procedure includes at least a quantity of bits corresponding to a quantity of the plurality of LBT subbands.

In an eleventh aspect, alone or in combination with one or more of the first through tenth aspects, the indication of the at least one status associated with the LBT procedure includes at least a quantity of bits that is greater than a quantity of the plurality of LBT subbands.

In a twelfth aspect, alone or in combination with one or more of the first through eleventh aspects, the indication of the at least one status includes one or more padding bits.

In a thirteenth aspect, alone or in combination with one or more of the first through twelfth aspects, the indication of the at least one status associated with the LBT procedure includes at least a quantity of bits that is less than a quantity of the plurality of LBT subbands.

In a fourteenth aspect, alone or in combination with one or more of the first through thirteenth aspects, the indication of the at least one status includes at least one bit that combines two or more statuses associated with two or more of the plurality of LBT subbands.

In a fifteenth aspect, alone or in combination with one or more of the first through fourteenth aspects, the indication of the at least one status omits one or more statuses associated with one or more of the plurality of LBT subbands.

In a sixteenth aspect, alone or in combination with one or more of the first through fifteenth aspects, the at least one status includes a plurality of statuses corresponding to a plurality of transmissions on the at least one sidelink channel.

In a seventeenth aspect, alone or in combination with one or more of the first through sixteenth aspects, the at least one status is based at least in part on a logic OR operation of LBT results of a plurality of transmissions.

In an eighteenth aspect, alone or in combination with one or more of the first through seventeenth aspects, the at least one status includes a plurality of statuses corresponding to a plurality of LBT subbands on the at least one sidelink channel, and each status of the plurality of statuses is based at least in part on a logic OR operation of LBT results of a plurality of transmissions on a corresponding one of the plurality of LBT subbands.

In a nineteenth aspect, alone or in combination with one or more of the first through eighteenth aspects, process 900 further includes transmitting (e.g., using transmission component 1104), to the UE, an additional resource grant for at least one additional sidelink channel, the resource grant indicating the uplink resource for transmitting sidelink transmission acknowledgement messages.

In a twentieth aspect, alone or in combination with one or more of the first through nineteenth aspects, receiving the indication of the at least one status comprises receiving an indication of at least one additional status, associated with an LBT procedure used on the at least one additional sidelink channel, combined with the indication of the at least one status.

In a twenty-first aspect, alone or in combination with one or more of the first through twentieth aspects, the at least one sidelink channel includes a plurality of LBT subbands, and the at least one additional sidelink channel includes an additional plurality of LBT subbands.

In a twenty-second aspect, alone or in combination with one or more of the first through twenty-first aspects, the at least one status includes a plurality of statuses corresponding to the plurality of LBT subbands, and receiving the indication of the at least one status comprises receiving an indication of a plurality of additional statuses, associated with an LBT procedure used on the at least one additional sidelink channel and corresponding to the plurality of additional LBT subbands, combined with the indication of the plurality of statuses.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
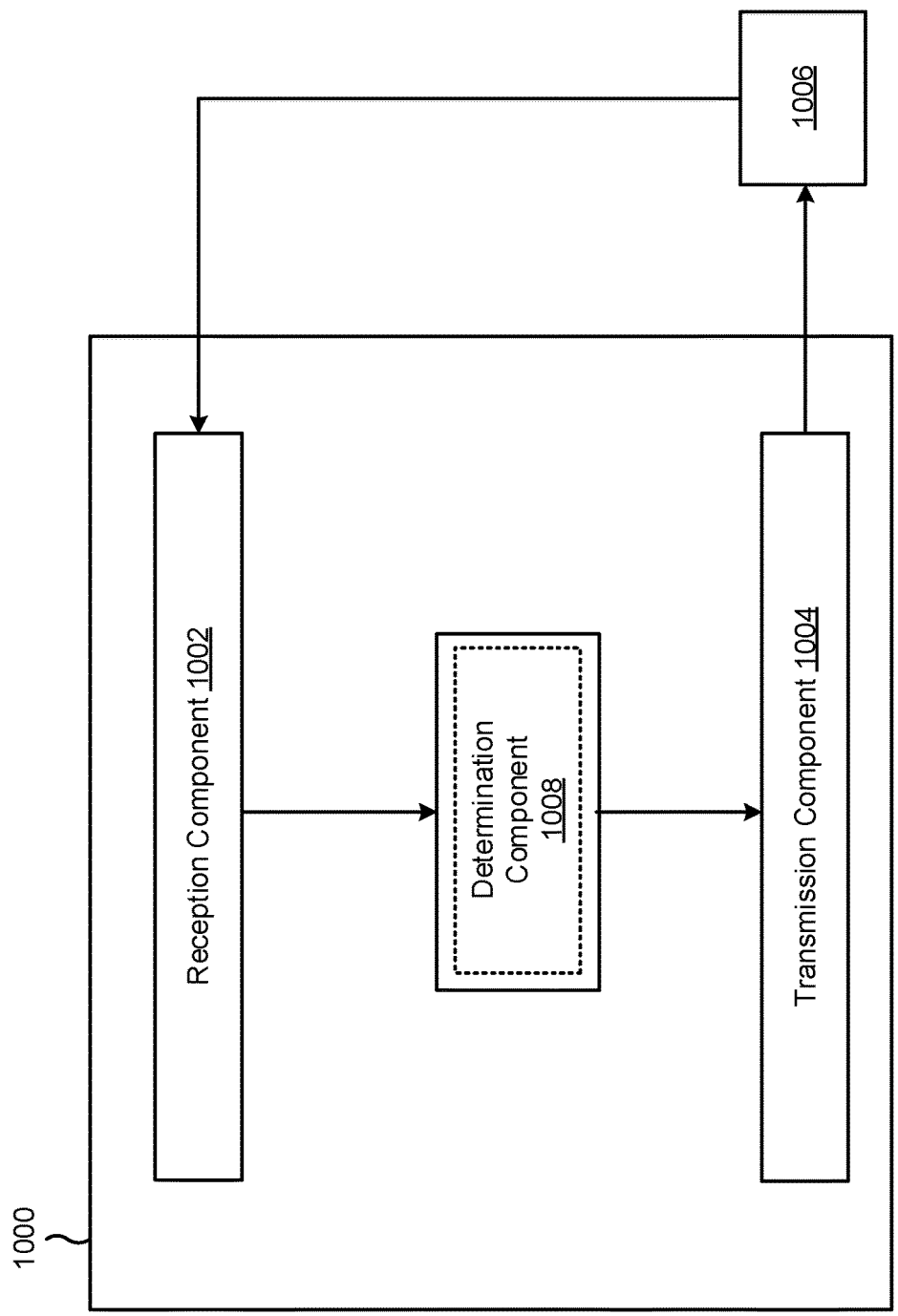
FIGS. 10 and 11 are block diagrams of example apparatuses for wireless communication, in accordance with various aspects of the present disclosure.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a determination component 1008, among other examples.

In some aspects, the apparatus 1000 may be configured to perform one or more operations described herein in connection with FIGS. 6-7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

In some aspects, the reception component 1002 may receive, from the apparatus 1006, a resource grant for at least one sidelink channel. In some aspects, the resource grant indicates an uplink resource for transmitting sidelink transmission acknowledgement messages. Accordingly, the transmission component 1004 may transmit, to the apparatus 1006 and on the uplink resource, an indication of at least one status associated with an LBT procedure used on the at least one sidelink channel. For example, the determination component 1008 may determine the at least one status associated with the LBT procedure. In some aspects, the determination component 1008 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

In some aspects, the reception component 1002 may further receive, from the apparatus 1006, an additional resource grant for at least one additional sidelink channel. In some aspects, the resource grant indicates the uplink resource for transmitting sidelink transmission acknowledgement messages. Accordingly, the determination component 1008 may determine at least one additional status associated with an LBT procedure used on the at least one additional sidelink channel. Additionally, in some aspects, the transmission component 1004 may transmit, to the apparatus 1006 and on the uplink resource, an indication based at least in part on the at least one status, associated with the LBT procedure used on the at least one sidelink channel, and the at least one additional status, associated with the LBT procedure used on the at least one additional sidelink channel.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
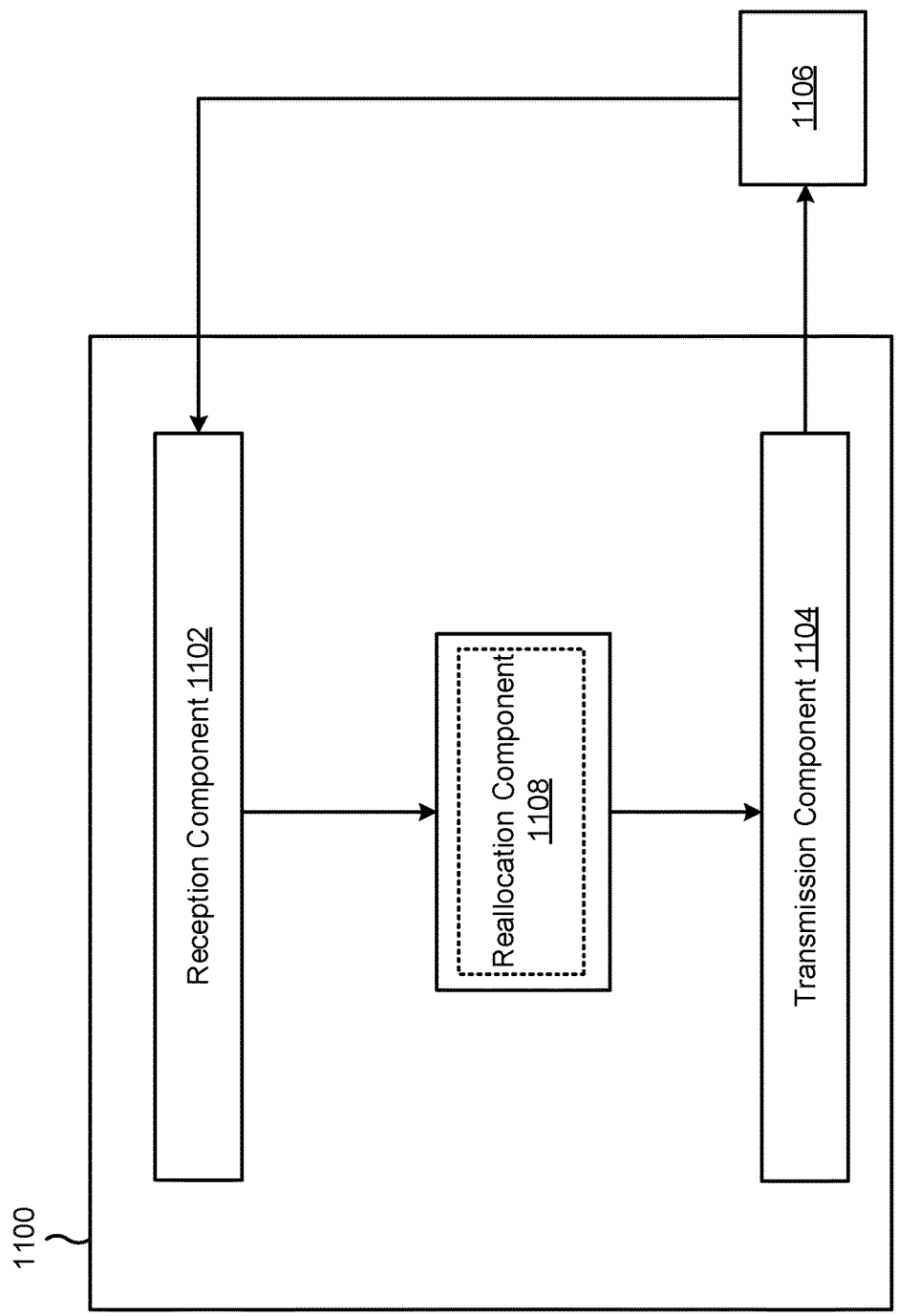

FIG. 11 is a block diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a reallocation component 1108, among other examples.

In some aspects, the apparatus 1100 may be configured to perform one or more operations described herein in connection with FIGS. 6-7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the base station described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the base station described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the base station described above in connection with FIG. 2. In some aspects, the transmission component 1104 may be co-located with the reception component 1102 in a transceiver.

In some aspects, the transmission component 1104 may transmit, to the apparatus 1106, a resource grant for at least one sidelink channel. In some aspects, the resource grant indicates an uplink resource for transmitting sidelink transmission acknowledgement messages. Accordingly, the reception component 1102 may receive, from the apparatus 1106 and on the uplink resource, an indication of at least one status associated with an LBT procedure used on the at least one sidelink channel.

In some aspects, the reallocation component 1108 may reallocate one or more subbands to and/or from the at least one sidelink channel, based at least in part on the indication. For example, the reallocation component 1108 may encode a new resource grant for the at least one sidelink channel, and the transmission component 1104 may transmit the new resource grant to the apparatus 1106. In some aspects, the reallocation component 1108 may include a modulator, a transmit MIMO processor, a transmit processor, a controller/processor, a memory, or a combination thereof, of the base station described above in connection with FIG. 2.

In some aspects, the transmission component 1104 may further transmit, to the apparatus 1106, an additional resource grant for at least one additional sidelink channel. In some aspects, the resource grant indicates the uplink resource for transmitting sidelink transmission acknowledgement messages. Accordingly, the reception component 1102 may receive, from the apparatus 1106 and on the uplink resource, an indication based at least in part on the at least one status, associated with the LBT procedure used on the at least one sidelink channel, and at least one additional status, associated with an LBT procedure used on the at least one additional sidelink channel.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
receiving, from a base station, a resource grant for at least one sidelink channel, wherein the resource grant indicates an uplink resource for transmitting sidelink transmission acknowledgement messages, wherein the at least one sidelink channel includes a plurality of listen-before-talk (LBT) subbands; and
transmitting, to the base station and on the uplink resource, an indication of at least one status associated with a listen-before-talk procedure used on the at least one sidelink channel, wherein the indication of the at least one status associated with the listen-before-talk procedure includes at least a quantity of bits greater than a quantity of the plurality of LBT subbands.

2. The method of claim 1, wherein the resource grant includes downlink control information (DCI).

3. The method of claim 1, wherein the at least one sidelink channel is over an unlicensed band channel.

4. The method of claim 1, wherein the uplink resource includes a physical uplink control channel (PUCCH) resource.

5. The method of claim 1, wherein the indication of the at least one status associated with the listen-before-talk procedure includes at least two bits.

6. The method of claim 1, wherein the at least one status associated with the listen-before-talk (LBT) procedure includes at least one of an LBT pass status or an LBT fail status.

7. The method of claim 6, wherein the LBT pass status is a sidelink transmission acknowledgement with LBT pass status or a sidelink transmission non-acknowledgement with LBT pass status.

8. The method of claim 6, wherein the LBT pass status is a sidelink transmission acknowledgement with LBT pass status, a sidelink transmission non-acknowledgement with LBT pass status, or a sidelink acknowledgement undetected with LBT pass status.

9. The method of claim 1, wherein the at least one status includes a plurality of statuses corresponding to the plurality of LBT subbands.

10. The method of claim 1, wherein the indication of the at least one status associated with the listen-before-talk procedure includes at least a quantity of bits corresponding to a quantity of the plurality of LBT subbands.

11. The method of claim 1, wherein the indication of the at least one status includes one or more padding bits.

12. The method of claim 1, wherein the indication of the at least one status associated with the listen-before-talk procedure includes at least a quantity of bits less than a quantity of the plurality of LBT subbands.

13. The method of claim 12, wherein the indication of the at least one status includes at least one bit that combines two or more statuses associated with two or more of the plurality of LBT subbands.

14. The method of claim 12, wherein the indication of the at least one status omits one or more statuses associated with one or more of the plurality of LBT subbands.

15. The method of claim 1, wherein the at least one status includes a plurality of statuses corresponding to a plurality of transmissions on the at least one sidelink channel.

16. The method of claim 1, wherein the at least one status is based at least in part on a logic OR operation of listen-before-talk (LBT) results of a plurality of transmissions.

17. The method of claim 1, wherein the at least one status includes a plurality of statuses corresponding to a plurality of listen-before-talk (LBT) subbands on the at least one sidelink channel, and wherein each status of the plurality of statuses is based at least in part on a logic OR operation of LBT results of a plurality of transmissions on a corresponding one of the plurality of LBT subbands.

18. The method of claim 1, further comprising:
receiving, from the base station, an additional resource grant for at least one additional sidelink channel, wherein the additional resource grant indicates the uplink resource for transmitting sidelink transmission acknowledgement messages; and
determining at least one additional status associated with a listen-before-talk procedure used on the at least one additional sidelink channel.

19. The method of claim 18, wherein transmitting the indication of the at least one status comprises transmitting the indication of the at least one additional status combined with the indication of the at least one status.

20. The method of claim 18, wherein the at least one sidelink channel includes a plurality of listen-before-talk (LBT) subbands, and wherein the at least one additional sidelink channel includes an additional plurality of LBT subbands.

21. The method of claim 20, wherein the at least one status includes a plurality of statuses corresponding to the plurality of LBT subbands, wherein the at least one additional status includes a plurality of additional statuses corresponding to the plurality of additional LBT subbands, and wherein transmitting the indication of the at least one status comprises transmitting the indication of the plurality of additional statuses combined with the indication of the plurality of statuses.

22. A method of wireless communication performed by a base station, comprising: transmitting, to a user equipment (UE), a resource grant for at least one sidelink channel, wherein the resource grant indicates an uplink resource for transmitting sidelink transmission acknowledgement messages, wherein the at least one sidelink channel includes a plurality of listen-before-talk (LBT) subbands; and receive, from the UE and on the uplink resource, an indication of at least one status associated with a listen-before-talk procedure used on the at least one sidelink channel, wherein the indication of the at least one status associated with the listen-before-talk procedure includes at least a quantity of bits greater than a quantity of the plurality of LBT subbands.

23. The method of claim 22, wherein the at least one sidelink channel includes a plurality of listen-before-talk (LBT) subbands, and the at least one status includes a plurality of statuses corresponding to at the plurality of LBT subbands.

24. The method of claim 22, wherein the at least one status includes a plurality of statuses corresponding to a plurality of listen-before-talk (LBT) subbands on the at least one sidelink channel, and wherein each status of the plurality of statuses is based at least in part on a logic OR operation of LBT results of a plurality of transmissions on a corresponding one of the plurality of LBT subbands.

25. The method of claim 22, further comprising:
transmitting, to the UE, an additional resource grant for at least one additional sidelink channel, wherein the additional resource grant indicates the uplink resource for transmitting sidelink transmission acknowledgement messages,
wherein receiving the indication of the at least one status comprises receiving an indication of at least one additional status, associated with a listen-before-talk procedure used on the at least one additional sidelink channel, combined with the indication of the at least one status.

26. The method of claim 25, wherein the at least one sidelink channel includes a plurality of listen-before-talk (LBT) subbands, wherein the at least one additional sidelink channel includes an additional plurality of LBT subbands, wherein the at least one status includes a plurality of statuses corresponding to the plurality of LBT subbands, and wherein receiving the indication of the at least one status comprises receiving an indication of a plurality of additional statuses, associated with a listen-before-talk procedure used on the at least one additional sidelink channel and corresponding to the plurality of additional LBT subbands, combined with the indication of the plurality of statuses.

27. A user equipment for wireless communication, comprising:

a memory; and one or more processors operatively coupled to the memory, the memory and the one or more processors configured to:

receive, from a base station, a resource grant for at least one sidelink channel, wherein the resource grant indicates an uplink resource for transmitting sidelink transmission acknowledgement messages, wherein the at least one sidelink channel includes a plurality of listen-before-talk (LBT) subbands; and transmit, to the base station and on the uplink resource, an indication of at least one status associated with a listen-before-talk procedure used on the at least one sidelink channel, wherein the indication of the at least one status associated with the listen-before-talk procedure includes at least a quantity of bits greater than a quantity of the plurality of LBT subbands.

28. A base station for wireless communication, comprising:

a memory; and one or more processors operatively coupled to the memory, the memory and the one or more processors configured to:

transmit, to a user equipment (UE), a resource grant for at least one sidelink channel, wherein the resource grant indicates an uplink resource for transmitting sidelink transmission acknowledgement messages, wherein the at least one sidelink channel includes a plurality of listen-before-talk (LBT) subbands; and receive, from the UE and on the uplink resource, an indication of at least one status associated with a listen-before-talk procedure used on the at least one sidelink channel, wherein the indication of the at least one status associated with the listen-before-talk procedure includes at least a quantity of bits greater than a quantity of the plurality of LBT subbands.

* * * * *